United States Patent
Dehghan et al.

(10) Patent No.: US 6,584,151 B1
(45) Date of Patent: Jun. 24, 2003

(54) ROBUST ADAPTIVE EQUALIZER

(75) Inventors: Hossein Dehghan, Danville, CA (US); Ting-Yin Chen, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/439,126

(22) Filed: Nov. 12, 1999

(51) Int. Cl.$^7$ .............. H03H 7/30; H03H 7/40; H03H 5/159
(52) U.S. Cl. .............. 375/232; 375/316; 708/323
(58) Field of Search ............... 375/229, 230, 375/232, 316, 324, 340, 346; 708/300, 322, 323; 333/18, 28 R

(56) References Cited

U.S. PATENT DOCUMENTS 5,550,810 A  *  8/1996  Monogioudis et al. ...... 370/342

* cited by examiner

Primary Examiner—Jean Corrielus
(74) Attorney, Agent, or Firm—Lathrop & Gage, L.C.

(57) ABSTRACT

An adaptive equalizer for use in a communication receiver that prevents equalizer operation divergence in response to slicer errors in a high noise communication application. The equalizer uses the difference between an equalized sample value and the nearest constellation point determined by the slicer both as the equalizer adaptation value and as a control value to selectively enable or minimize (disable) adaptation modifications. The difference is compared to a threshold value to determine whether the difference should be applied to the equalizer for adaptation purposes or a minimal value to prevent equalizer divergence in response to significant slicer errors. The threshold value is determined as a function of the ratio of the probability of correct slicer determinations and the probability of incorrect slicer determinations for a given sample value and a given signal to noise ratio. The threshold value may be predetermined as a constant for a particular communication application or may be dynamically computed as communications proceed.

12 Claims, 3 Drawing Sheets

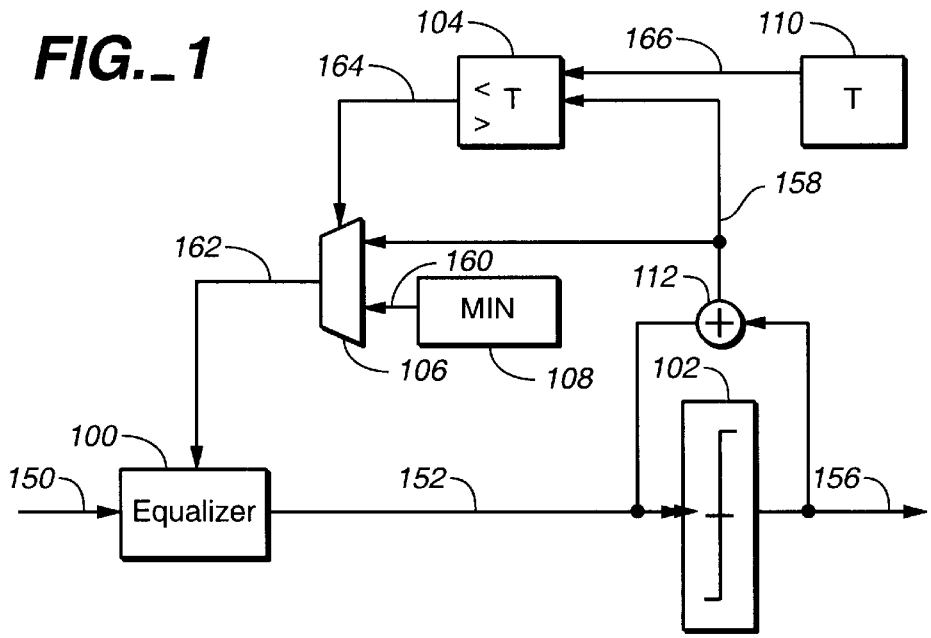
FIG._1
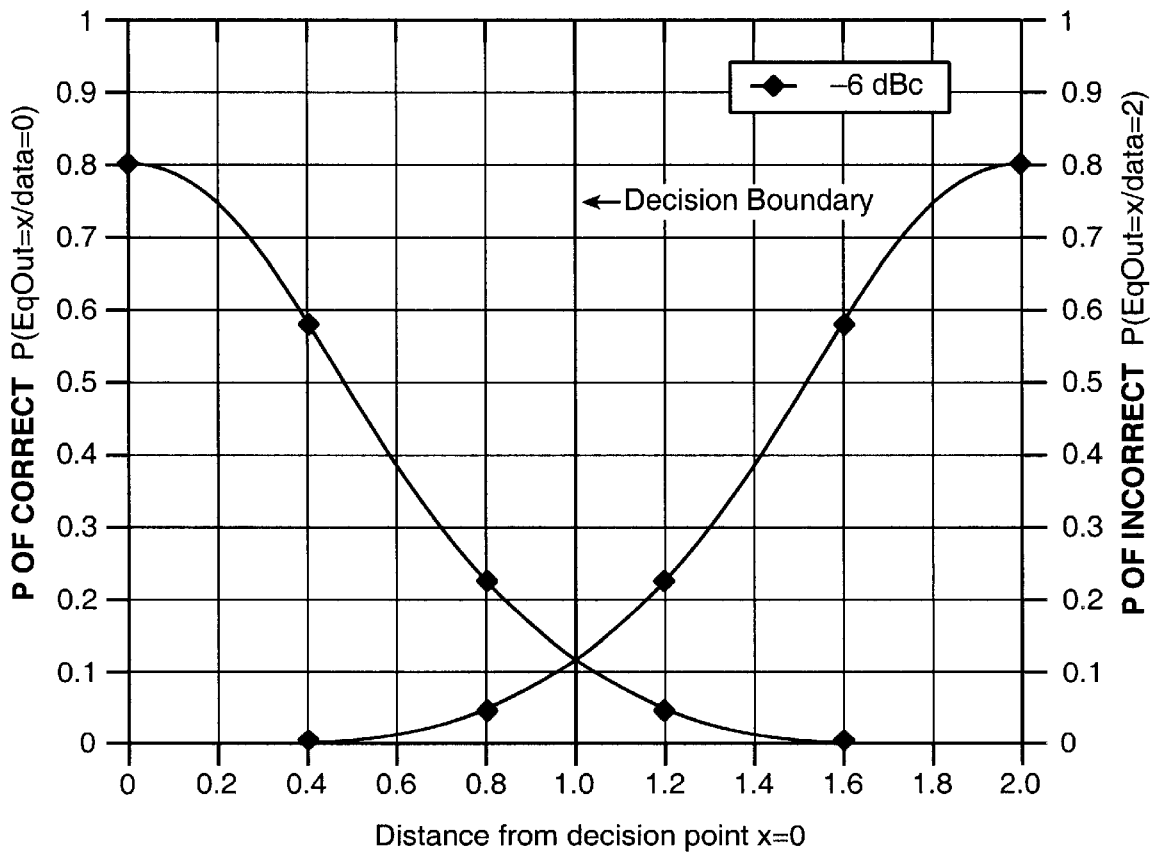
FIG._2

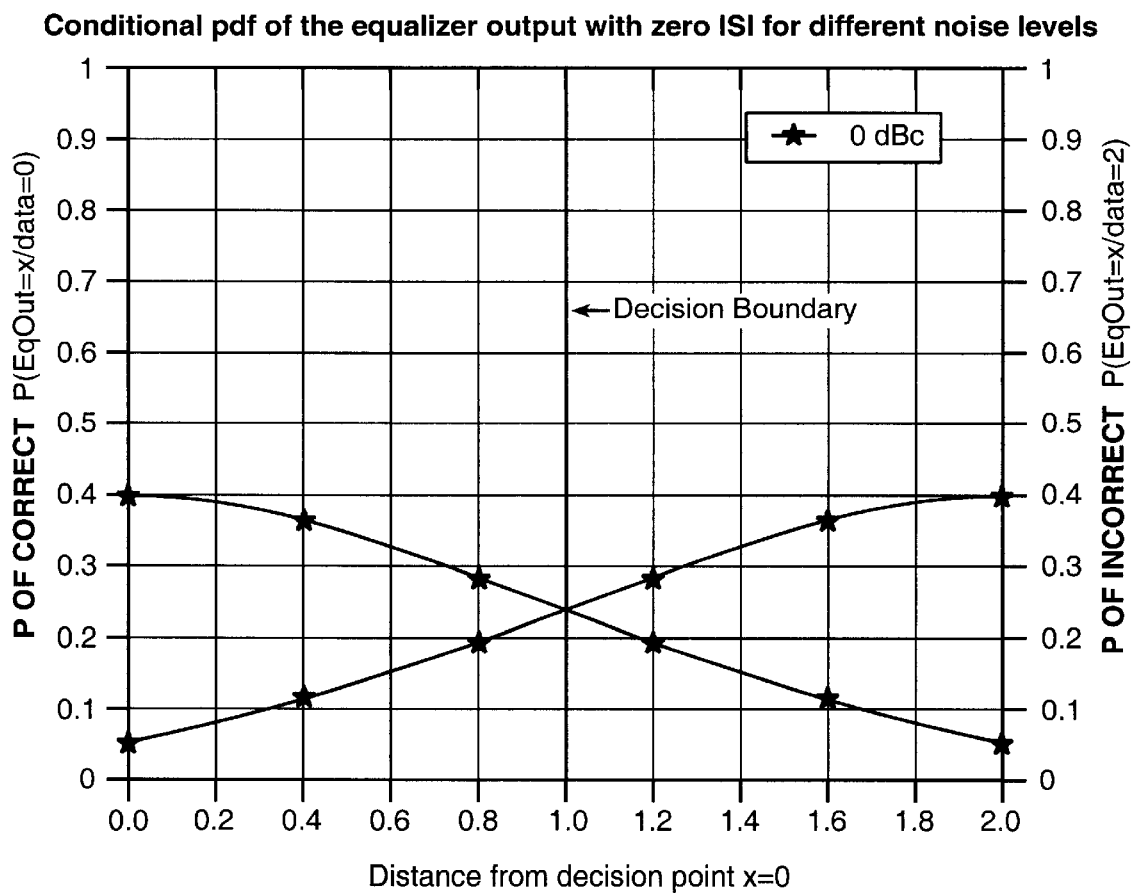
FIG._3

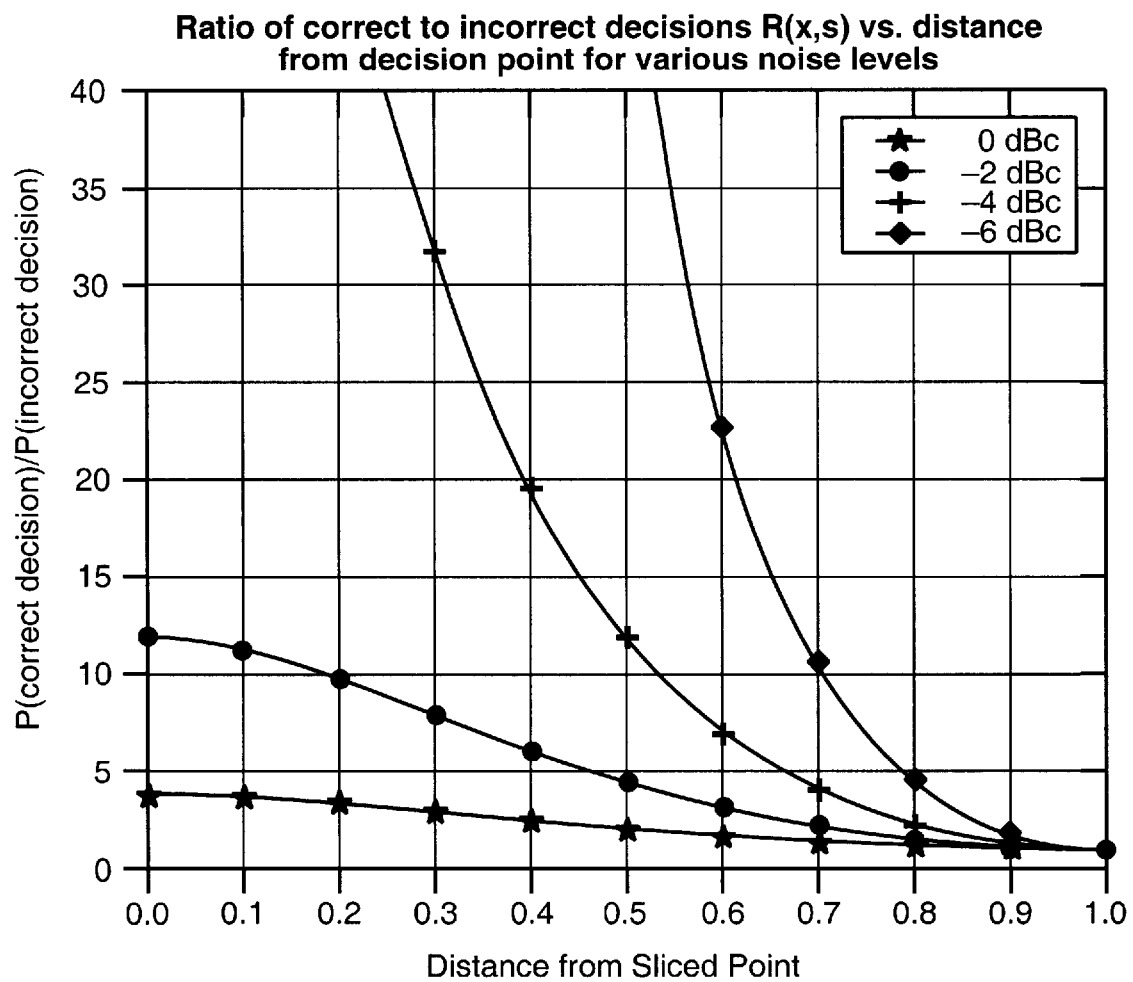
FIG._4

ROBUST ADAPTIVE EQUALIZER

BACKGROUND OF THE INVENTION

1. Field of the Invention

The present invention relates to signal processing as often used in communication systems. More specifically, the present invention relates to equalizers and permits adaptive control of an equalizer using robust techniques for operation in high noise environments such as is common in wireless, microwave, cable and other communication systems.

2. Discussion of Related Art

Communication systems communicate information between a transmitter and a receiver. A broad class of communication systems communicate information by modulating and demodulating data over a communication medium. The information is most frequently digital data, i.e., data that is represented as a sequence of binary digits ("bits" having values of 1 or 0). The digital information is transmitted as an analog signal over the communication medium. Such an analog signal may include electronic or electromagnetic signals as well as optical signals (light transmitted over optical communication media).

Typically, a carrier signal is transmitted over the communication medium and is modulated in such a manner to represent the digital data to be transferred between the devices. That is, an analog attribute of a carrier signal is modulated by the transmitter to encode data over the communication medium and demodulated by the receiving device to receive the data. For example, the amplitude or frequency of an electronic or electromagnetic signal may be modulated higher or lower from a carrier base level to encode the data. The receiving device then detects the modulations of the carrier signal attribute to decode (demodulate) the data encoded within the received signal.

The processing of the received signal to demodulate and decode the transmitted information is generally referred to as signal processing. Such signal processing is often performed by periodically sampling the received analog signal, converting the sampled signals to digital representations of the analog signal waveform and then processing the digital sampled values using digital signal processing techniques to demodulate and decode the information encoded in the received signal.

In many such communication systems analog noise signals or other interfering signals are superposed on the transmitted signals by environmental effects. For example, ambient electromagnetic signals, ubiquitous in our modern environment, may interfere with the effective transmission of information via the communication medium. Or, for example, electrical or other properties of the communication medium may degrade the quality of the received signal as data transmission rates are increased and/or as transmission distances are increased.

In such noisy environments, it is common in communication systems to process the signals in such a manner as to reduce the effects of such noise at the receiving end and to thereby improve the efficacy of data transmission between the transmitting and receiving devices.

It is known in the art to use a decision device (circuit), commonly referred to as a slicer, to detect the signal transmitted without the effect of superposed environmental noise. In general, a slicer detects that a sampled signal value has or has not made a transition to a predetermined signal threshold value. Such modulation transitions in the received signal are representative of the encoded digital information. Noisy environments or interfering signals as noted above can cause the slicer to erroneously detect the transmissions and therefore the encoded digital information.

To improve the efficacy of the slicer, it is known to use an equalizer—a filter adapted to improve the quality of the signal for purposes of slicer data decoding. An adaptive equalizer is one that may be adapted to modify its filtration characteristics in accordance with a control input signal applied to the equalizer. An equalizer and slicer are generally configured in a feedback configuration such that the equalizer is adapted to change its filtration based on an error calculated at the receiver by comparing the slicer input and perceived transmitted data with the actual transmitted information (expected information).

Conventional adaptive equalizers as known in the art are ineffective in high noise environments. Their stable operation depends on relatively reliable detection of transmitted signals by the slicer circuit that provides the feedback control signal to the equalizer (i.e., nearly correct detection as may be possible only in a low noise environment). Such conventional equalizers use estimates of the transmitted signal generated by the slicer to guide the adaptation of the equalizer filtration. In high noise environments the slicer estimates may be so inaccurate as to render the equalizer ineffective. The equalizer adaptation may diverge far from a desired optimum performance range due to such erroneous slicer estimates.

A number of approaches are known in the art to prevent such divergence of the equalizer. A first approach uses circuits downstream from the slicer, often referred to as a decoder, for more accurate estimates of the transmitted signal. The decoder circuit receives the slicer output and further decodes the detected information in accordance with known rules of encoding of information on the communication medium. The decoder therefore can more accurately detect the transmitted data because it understands the rules of data encoding—it distinguishes expected, legal sequences as compared to unexpected or illegal sequences. However, this approach has a negative aspect in that the decoder makes its decisions based on sequences of transitions as distinct from slicer decisions based on real time sampled values. The decisions from such a decoder are based on a sequence of samples and thus sample values must be buffered to adapt the equalizer before being passed on to the adaptive equalizer for filtration. In effect a first decoder is used with buffering in advance of applying the samples to the adaptive equalizer then a second decoder receives the delayed equalized output values from the equalizer. This added delay (latency) in adapting the equalizer filtration renders the equalizer ineffective for adapting to rapid changes in the noise levels. Further, this approach adds the need for a memory associated with the equalizer to store received sequences of sampled signals for later adaptation.

A second approach to avoid divergence of the equalizer filtration is to use only certain types of received signals for purposes of equalization adaptation. For example, where the received signals are known to be less reliable (i.e., high order modulation) adaptation is disabled. Adaptation is enabled only when received signals are known to be more reliable (i.e., low order modulation). Or for example, special data sequences, commonly known as training sequences, may be injected into the data transmission to allow adaptation at predetermined times with predetermined sequences known to be less sensitive to noise or interference. Such approaches suffer from problems adapting to rapidly changing noise or interference signals. In addition, injection of special adaptation sequences decreases the overall effective data rate for the communication channel by utilizing a portion of the available bandwidth for sequences carrying no user data. Further, such approaches are complex in that they must assure synchronization to distinguish the signals for which adaptation is enabled from signals for which adaptation is disabled. Lastly, such approaches require storage or generation circuits for the sequences to be used for enabling or disabling adaptation.

It is apparent from the above discussion that a need exists for improved circuits and techniques for adaptation of equalization filters that can improve equalizer adaptation in high noise environments.

SUMMARY OF THE INVENTION

The present invention solves the above and other problems, thereby advancing the state of the useful arts, by providing an equalizer adaptation circuit and method more immune to high noise environments. A function of the difference between the equalizer output and the nearest expected value detected by the slicer is used in comparison with a threshold value to dynamically adjust the adaptation of the equalizer. Where the function value is above the threshold value, further adaptation adjustment of the equalizer filtration may be halted or minimized. When the function value is below the threshold, full adaptation of the equalizer in accordance with the sensed difference is enabled. In this manner, divergence of the equalizer caused by excessive errors in the slicer output may be avoided. The threshold value may be dynamically computed to further enhance the adaptation of the equalizer operation.

More specifically, the threshold value may be determined a priori as a function of expected signal to noise ratio for the communication application or may be determined dynamically from signal to noise ratio measurements at the receiver based on 2nd order statistics of the channel noise. In general, the difference (distance) between the equalizer output value and the nearest expected value (closest constellation point) is compared to the present threshold value. If the distance is less than the threshold, then the difference between the equalizer output and the slicer output is used to adapt the equalizer filtration. If the distance is greater than the threshold value, further equalizer adaptation is halted (or lessened) until the distance again falls below the threshold value.

This adaptation technique and circuit reduces the potential for equalizer divergence while providing rapid adaptation to permit real time equalizer adaptation without loss of channel available bandwidth. Further, the adaptation technique and circuit of the present invention is simpler than prior techniques for avoiding equalizer divergence.

BRIEF DESCRIPTION OF THE DRAWINGS

FIG. 1 is a block diagram of the adaptive equalizer control circuit of the present invention.

FIG. 2 is a graph of the conditional probability distribution of the equalizer of FIG. 1 for two adjacent constellation points in a low noise environment.

FIG. 3 is a graph of the conditional probability distribution of the equalizer of FIG. 1 for two adjacent constellation points in a high noise environment.

FIG. 4 is a graph of the ratio function of the adaptive equalizer of FIG. 1 in different noise environments.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Adaptation Control Circuit and System

FIG. 1 is a block diagram of a communications receiver having an adaptation control circuit in accordance with the present invention. Those skilled in the art will recognize that FIG. 1 provides a functional diagram of the essential components relating to the present invention. The functional elements depicted may be implemented in any of several equivalent structures. In the preferred embodiment, the depicted functional elements are implemented as modules within a digital signal processing device or an application specific integrated circuit (ASIC). Though not common in present technology, such a device could also be implemented using analog circuits and related discrete components.

Sampled input signal values from an input signal source (not shown) are applied via path 150 as input to adaptive equalizer 100. Filtered sample values are applied as output of the adaptive equalizer 100 on output path 152. The adaptation of adaptive equalizer 100 is controlled by a control signal received via path 162 on its control signal input. Structure and operation of such an adaptive equalizer 100 is well known to those skilled in the art and need not be further discussed herein.

Filtered sample values on path 152 are applied as input to slicer circuit 102. Slicer circuit 102 estimates the transmitted sample values in accordance with predetermined threshold values. The predetermined values are often referred to as constellation points and are representative of idealized signal values of modulated data in the transmitted signal in accordance with the modulation techniques applied to the communication medium. Output signals generated by slicer 102 are applied to path 156 and represent detected constellation points corresponding to filtered sample input values. The detected constellation points are the nearest estimate of an idealized constellation point corresponding to the sampled values. Slicer 102 is often said to "map" the sampled values applied to its input into the nearest constellation points of the selected modulation technique applied to the communication medium. Structure and operation of slicer circuit 102 is well known to those skilled in the art and need not be further discussed herein.

In accordance with the present invention, adder circuit 112 receives the filtered sample values as a first input on path 152 and the idealized corresponding constellation point estimated by slicer circuit 102 as a second input on path 156. Adder circuit 112 then determines the difference e as $x-x_d$ where x is the sampled filtered value and $x_d$ is the nearest constellation point estimated by the slicer 102. The difference value e is applied to the output of adder circuit 112 on path 158.

Comparator circuit 104 compares difference value e, also known as the slicer error, on its input path 158 to a predetermined threshold value T applied to its input path 166. If e is greater than T, a first comparison signal is applied to output path 164 of comparator circuit 104. If difference value e is less than threshold value T, a second comparison signal is applied to output path 164 of comparator circuit 104.

As noted herein, threshold value T may be statically predetermined in accordance with the communication application of the system or may be dynamically computed in accordance with measured parameters of the communication system in process. Threshold value source 110 is therefore representative of either such a static or dynamic source of threshold values. Where a static threshold value is supplied, threshold value source 110 may be implemented as a register or other memory device to simply store a precomputed static value. Where dynamic computation of the threshold value is desired, threshold value source 110 represents the measurement and computation functions within the system of the present invention. Computation of threshold value is in accordance with the discussion herein below. Such measurement and computation functions within a system of the present invention are well known to those skilled in the art.

The comparison signal applied to output path 164 of comparator circuit 104 is received as a selection control input signal of multiplexor 106. Multiplexor selectively applies one of two input signals to its output path 162 in accordance with the comparison signal received on selection control input path 164. A first input on path 158 is the difference value e generated by adder circuit 112 as above. The second input on path 160 is a predetermined divergence minimization value used to minimize or halt further adaptation of adaptive equalizer 100. The selected input path is applied to multiplexor output path 162 as the adaptive control signal to adaptive equalizer 100. Where comparator circuit 104 indicates that difference value e is less than threshold value T, the difference value e is applied through multiplexor 106 as the adaptive control signal to adaptive equalizer 100. Where difference value e exceeds threshold value T, the divergence minimization value is applied through multiplexor 106 as the adaptive control signal to adaptive equalizer 100.

The divergence minimization value is applied to path 160 by divergence minimization value source 108. In the preferred embodiment, divergence minimization value source 108 is a constant-value of zero to disable further adaptation by adaptive equalizer 100. In an alternative embodiment, a small value may be used to reduce the adaptation of equalizer 100 but not to totally disable any further adaptation. This small value may be constant or may be chosen proportional to the size of the measured slicer error.

Adaptation Threshold Value Determination

The threshold value is determined as a function of the probability of correct and incorrect determinations by the slicer for a particular sample value and for a particular signal to noise ratio of the communication application. The graph of FIG. 2 shows the conditional probability distribution of the output of adaptive equalizer 100 for two adjacent constellation points of an M-pulse amplitude modulation (M-PAM) communication application. The X-axis of the graph of FIG. 2 indicates the distance of a sampled value "X" from the closest two adjacent constellation points. The Y-axis is the probability of a correct or incorrect decision by the slicer circuit as a function of the distance from the adjacent constellation points. Two plots are shown on FIG. 2 corresponding to a low noise power of −6 dBc. A first plot (labeled 200) represents the probability of a correct decision by the slicer where the actual signal represents a data constellation point of 0 (d=0). A second plot (labeled 202) represents the probability of a correct decision where the actual signal represents a data constellation point of 2 (d=2).

As can be seen in the two plots, the probability for a correct decision by the slicer for d=0 starts high for x (the actual sampled value) equal to 0 and exponentially decreases as x moves further from the intended constellation point toward x=2. Conversely, the probability for a correct decision by the slicer for d=2 start low for x=0 and rises exponentially as x moves further toward the intended constellation point of x=2. FIG. 3 show the same plots for a high noise environment (for d=0 as plot 300 and for d=2 as plot 302). The ratio between the two plots on each figure is a measure of reliability of the slicer decisions. Assuming the detected constellation point is (2n−1)d (i.e., the closest point to the received signal point x) and assuming that only the two adjacent constellation points ((2n+1)d and (2n−3)d) can cause detection errors, the ratio R(x,s) where x is the sampled value and s is the signal to noise ratio can be written as:

$$R(x,s) = \frac{P_d(x-(2n-1)d,s)}{P_d(x-(2n+1)d,s)+P_d(x-(2n-3)d,s)} \quad 0 \le x \le 2n$$

Note that R(x,s) is a function of the standard deviation of the equalizer output noise, s, as well as the received sample value, x.

FIG. 4 is a graph showing the function R(x,s) for various values of equalizer output noise. For purposes of FIG. 4, the noise is presumed to be signal to noise ratio with zero intersymbol interference. Where intersymbol interference is non-zero, such interference may be treated the same as other noise. Specifically, FIG. 4 shows four plots of the function R(x,s), one for each of four values of s. Specifically, plot 400 is for a high noise environment (0 dBc), plot 402 for a lower noise environment (−2 dBc), plot 404 for still lower noise (−4 dBc) and plot 406 for a low noise environment (−6 dBc).

As seen in these plots, R(x,s) decreases as x and/or s increases. One way of achieving a certain level of confidence in the slicer operation and its associated error signal (e=x−$x_d$) is by considering only those error signals that are derived with a certain probability of correctness, i.e.,:

$$R(x,s) > Q$$

where Q is the minimum desirable ratio of correct decisions to incorrect decisions for any received signal x and is related to the probability of correctness of the slicer decision by:

$$P(correctdecision/x) = \frac{Q}{Q+1}$$

The criterion of admissibility given the equations above can be equivalently written in terms of the distance of the received signal (x) from the nearest constellation point (2n−1)d, i.e.:

$$x-(2n-1)d < T(Q)$$

where T is the threshold of admissibility of the received signal's error. The relationship between T and Q can be found by manipulating the above equations to get:

$$R(x,s) = \frac{1}{e^{\frac{2(x-2nd)}{s^2}} + e^{\frac{-2(x-2(n-1)d)}{s^2}}}$$

Solving the above equation for (2n−1)d (the slicing error), and substituting for Q from the above equations we get:

$$x-(2n-1)d < a\cosh\left(\frac{e^{\frac{2d}{s^2}}}{Q}\right) = T$$

It can be seen that in the above relationship the threshold of admissibility T will increase as $s^2$ (noise power) decreases and/or Q decreases.

In practice the threshold value can be determined using Q either based on the a priori expected signal to noise ratio as specified in the application or from dynamic signal to noise ratio measurements at the receiver. The value of Q can be chosen independent of the noise specification of the channel. Extensive simulations have shown that a static value of Q=2 is a reasonable value for ensuring convergence of the equalizer filtration in a very noisy channel. Using T as the criterion of usefulness and admissibility to discriminate between the measured slicer's error, the updating algorithm as implemented in circuit diagram FIG. 1 can be expressed as:

$$e' = \begin{cases} e, & |x + (2n-1)| < T \\ 0, & \text{otherwise} \end{cases}$$

As noted elsewhere herein, the value of zero (divergence minimization value) used when the slicer error is outside the threshold value may also be implemented as a minimal value programmable for a particular application. A small value may allow some continued adaptation to the equalization but slow the process to avoid divergence. Such design choices are well known to those skilled in the art.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. An equalizer adaptation circuit comprising:
   an adder circuit for determining the magnitude of the difference between the output of a slicer circuit and the output of an equalizer circuit;
   a comparator circuit, coupled to said adder circuit, for comparing said difference to a threshold value and for generating a comparison signal indicative of the result of comparison of said difference to said threshold value; and
   a multiplexor coupled to said comparator circuit and having a first input coupled to said adder circuit and having its output coupled to said equalizer for selectively applying said difference to said equalizer circuit in response to said comparison signal.

2. The circuit of claim 1 wherein said threshold value is predetermined.

3. The circuit of claim 1 further comprising:
   computation means coupled to said adder circuit and coupled to said comparator circuit for computing said threshold value as a function of the slicer's output.

4. The circuit of claim 3 wherein said computation means includes:
   means for computing said threshold value T as:

$$T = a \cosh\left(\frac{e^{\frac{2d}{s^2}}}{Q}\right)$$

where s is the standard deviation of the equalizer output noise and d is an expected constellation point.

5. The circuit of claim 1 further comprising:
   a divergence minimization value register coupled as a second input to said multiplexor for selectively applying a divergence minimization value to said equalizer circuit in response to said comparison signal.

6. The circuit of claim 1 further comprising:
   an equalization disabling circuit coupled to said comparator circuit for selectively disabling application of said difference to said equalizer circuit in response to said comparison signal.

7. A communication receiver system including:
   an adaptive equalizer circuit coupled to a signal input source for applying filtered signal values to the output of said equalizer circuit;
   a slicer circuit coupled to the output of said equalizer for detecting transitions in said filtered signal values and for applying corresponding sliced output signal values to the output of said slicer circuit;
   an adder circuit having a first input coupled to said output of said equalizer circuit and having a second input coupled to said output of said slicer circuit for determining a magnitude of the difference between said filtered signal values and a corresponding one of said sliced output signal values and for applying said difference to the output of said adder circuit;
   a threshold value source for providing a threshold value at an output;
   a comparator circuit having a first input coupled to said output of said adder circuit and having a second input coupled to said output of said threshold value source for comparing said difference to said threshold value and for applying a comparison signal to the output of said comparison circuit;
   a divergence minimization value source for providing a divergence minimization value at an output; and
   a multiplexor having a selection input coupled to said output of said comparison circuit and having a first input coupled to said output of said adder circuit and having a second input coupled to said output of said divergence minimization value source wherein said multiplexor is operable to apply said difference to said equalizer circuit in response to a first comparison signal applied to said selection input and is operable to apply said divergence minimization value to said equalizer circuit in response to a second signal applied to said selection input.

8. The system of claim 7 wherein said threshold value source includes:
   computation means for computing said threshold value as a function of the slicer's output.

9. The circuit of claim 8 wherein said computation means includes:
   means for computing said threshold value T as:

$$T = a \cosh\left(\frac{e^{\frac{2d}{s^2}}}{Q}\right)$$

where s is the standard deviation of the equalizer output noise and d is an expected constellation point.

10. A method for equalizer adaptation in a communication receiver including the steps of:
    applying sampled signal values received by said receiver to an equalizer circuit to generate filtered signal values;
    applying said filtered signal values to a slicer circuit to generate estimated values of data received by said receiver;

applying said filtered signal values and said estimated values to an adder circuit to determine a magnitude of the difference between each of said filtered signal values and a corresponding one of said estimated values;

comparing said difference to a predetermined threshold value to generate a comparison signal; and applying said difference to said equalizer circuit in response to a first comparison signal value and applying a divergence minimization value to said equalizer circuit in response to a second signal value.

11. The method of claim 10 further including the step of:

computing said threshold value as a function of the slicer's output.

12. The circuit of claim 11 wherein the step of computing includes the step of:

computing said threshold value T as:

$$T = a \; \mathrm{cosh}\left(\frac{e^{\frac{2d}{s^2}}}{Q}\right)$$

where s is the standard deviation of the equalizer output noise and d is an expected constellation point.

* * * * *